(12) United States Patent
Johnson

(10) Patent No.: US 6,482,350 B1
(45) Date of Patent: Nov. 19, 2002

(54) LOW PROFILE BLOW PIN ASSEMBLY FOR A ROTARY BLOW MOLDING MACHINE AND METHOD OF BLOW MOLDING

(75) Inventor: David M. Johnson, Saline, MI (US)

(73) Assignee: R&B Machine Tool Company, Saline, MI (US)

( * ) Notice: Subject to any disclaimer, the term of this patent is extended or adjusted under 35 U.S.C. 154(b) by 0 days.

(21) Appl. No.: 09/533,054

(22) Filed: Mar. 22, 2000

(51) Int. Cl.⁷ .......................... B29C 49/04; B29C 49/36; B29C 49/58
(52) U.S. Cl. .................. 264/543; 425/532; 425/535; 425/540
(58) Field of Search ................... 425/535, 540, 425/532; 264/542, 543, 540

(56) References Cited

U.S. PATENT DOCUMENTS

| | | | | |
|---|---|---|---|---|
| 3,081,489 A | * | 3/1963 | Jackson et al. | |
| 3,337,911 A | * | 8/1967 | Di Settembrini | |
| 3,344,471 A | * | 10/1967 | Martelli | |
| 3,466,702 A | * | 9/1969 | Stenger | |
| 3,496,599 A | * | 2/1970 | Brown | |
| 3,504,397 A | * | 4/1970 | Langecker | |
| 3,523,329 A | * | 8/1970 | Gallay | |
| 3,608,135 A | * | 9/1971 | Schurman | |
| 4,187,070 A | * | 2/1980 | Martin, Jr. | 425/535 |
| 4,248,582 A | | 2/1981 | Martin, Jr. | |
| 4,919,607 A | | 4/1990 | Martin et al. | |
| 5,971,741 A | | 10/1999 | Weber | |

* cited by examiner

Primary Examiner—Robert Davis
(74) Attorney, Agent, or Firm—Reising, Ethington, Barnes, Kisselle, Learman & McCulloch, P.C.

(57) ABSTRACT

A blow pin assembly for a mold of a rotary blow molding machine includes a base, a carriage supported by and movable relative to the base, a sub-base supported by and movable relative to the carriage, and a blow pin mounted to the sub-base for movement between a home position and a mold-engaging position. The blow pin is constructed with a low profile to clear an extruder head above the mold. This permits a method of forming a blow molded product to be used wherein the blow pin is inserted into the mold (and a parison in the mold), while the mold is at the extrusion workstation of the blow molding machine or very nearly so.

10 Claims, 5 Drawing Sheets

LOW PROFILE BLOW PIN ASSEMBLY FOR A ROTARY BLOW MOLDING MACHINE AND METHOD OF BLOW MOLDING

TECHNICAL FIELD

This invention relates generally to blow pin assemblies used on rotary blow molding machines.

BACKGROUND OF THE INVENTION

Blow molding machines are used to form hollow, plastic articles such as milk bottles and other liquid containers. The blow molded article is formed in a mold that is constructed from a pair of mold halves which are clamped together around an extruded section of softened thermoplastic resin (referred to as a parison). After clamping, a blow pin is inserted into an opening of the mold and parison and air is then forced through the blow pin into the interior of the parison so that it conforms to the surface of the mold cavity. Movement of the blow pin into and out of the opening in the mold cavity is typically done automatically using a blow pin assembly that operates under PLC control.

On shuttle blow molding machines, the mold is usually moved, or shuttled, between an extrusion work station and a blow pin workstation. At the extrusion workstation, an extruder head extrudes a generally cylindrical or tubular parison between the two halves of an open mold. The mold is then clamped shut around the parison and the mold is transported to the blow pin workstation where a blow pin moves downward and into engagement with the opening in the mold cavity, with the blow pin extending slightly into the center of the tube of parison. Air is then blown into the parison to expand it against the sides of the mold cavity.

Sometimes, the rim of the molten parison collapses or gets folded over, thereby preventing the blow pin from entering into the center of the parison. As a result, the parison is not properly expanded in the mold and the resulting article must be rejected. To avoid this problem, the blow pin has sometimes been used to pre-blow the parison; that is, air is forced through the blow pin as it is being brought down into engagement with the mold to help hold the parison open.

On rotary blow molding machines, the molds are located on a carrousel that indexes the molds in a circular path through different workstations. The molds are paused at each workstation for a different operation such as, for example, extrusion of the parison into the mold at an extrusion workstation. On these types of blow molding machines, the blow pin assembly may be mounted on the carrousel so that it indexes with its associated mold. Typically, this is done by mounting the blow pin assembly on the mold clamp so that it moves with one of the two halves of the mold clamp. However, since the blow pins are indexed around through the workstations along with their associated molds, the blow pin assembly must not only move the blow pin into and out of the mold opening, but must also retract the blow pin away from above the opening. Otherwise, the blow pin would interfere with the extrusion head when it dispenses a parison at the extrusion workstation.

As a result, blow pin assemblies for rotary blow molding machines have been designed to move the blow pin along an arcuate path between a retracted, or home, position and an extended or mold-engaging position. See, for example, U.S. Pat. No. 4,919,607, issued Apr. 24, 1990 to M. Warren Martin et al. However, one problem with these types of blow pin assemblies is that, because of the arcuate path, the blow pin does not enter the opening along a purely linear path (i.e., along the central axis of the mold cavity that extends through the opening). While the Martin et al. patent utilizes a pivotal linkage that minimizes the arcuate travel of the blow pin as it approaches and enters the opening in the mold, the movement of the blow pin nonetheless has a horizontal component to it that can result in the blow pin catching the upper edge of the parison and folding it over and at least partially closing the open end of the parison that receives the blow pin. This makes proper expansion of the parison in the mold impossible. Also, with this type of blow pin assembly it may not be possible to pre-blow the parison because the blow pin is not entering from directly above the parison and doing so can again fold over the upper edge of the parison.

Nonetheless, after a parison is provided into the mold and the extruder head is retracted away from the mold, the mold along with its blow pin mounted thereon is indexed a significant distance downstream of the extruder so that the blow pin clears the extruder head and can be inserted into the mold. This significant movement of the mold after extrusion and before insertion of the blow pin can introduce a number of disadvantages. For example, it can increase cycle time and/or reduce the time available to blow pressurized air into the parison, and can cause the parison to sag or shift in the mold. This reduces the efficiency of the blow molding machine, can result in insufficient cooling of the formed part causing post-blowing handling and processing problems and can cause inconsistent wall thickness of the formed part.

Additionally, it is desirable to insert the blow pin and inject pressurized air into the parison as soon as possible after the parison is extruded because the parison becomes less pliable as it cools and hardens. Also, the sooner the blow pin is inserted into the parison, the lower the chance of the parison collapsing or otherwise becoming misaligned within the mold.

Accordingly, there exists the need for a blow pin assembly for a rotary blow molding machine that reduces the possibility of the blow pin catching and folding over the edge of the parison and that permits the parison to be pre-blown to better improve the yield of the machine. Still further, there exists the need for a low. profile blow pin assembly which can be readily inserted into a parison soon after it is extruded and a method for forming a blow molded plastic product wherein the blow pin is inserted substantially at the extrusion workstation of the blow molding machine to avoid the notable and significant disadvantages associated with significant movement of the mold from the extruder workstation prior to insertion of the blow pin and application of the forced air into the parison.

SUMMARY OF THE INVENTION

In accordance with the invention there is provided a blow pin assembly which overcomes the above-noted disadvantages of prior art blow pin assemblies used on rotary blow molding machines. The blow pin assembly includes a base, a carriage supported by and movable relative to the base, a sub-base supported by and movable relative to the carriage, and a blow pin mounted to the sub-base for movement therewith. The assembly includes a first actuator that is coupled between the base and the carriage and a second actuator that is coupled between the carriage and sub-base. The first actuator is operable to cause the carriage and sub-base to move relative to the base. The second actuator is operable to cause the sub-base to move relative to the carriage. As a result of activation of the first and second actuators, the blow pin can be reciprocated between a home position and a mold-engaging position with the blow pin moving into and out of the mold-engaging position along a path that is substantially coincident with the central axis that extends through the opening in the mold cavity.

Preferably, the first actuator moves the carriage and sub-base in a direction that is generally perpendicular to the central axis, such that the blow pin moves between the home position and an alignment position in which the blow pin is located directly over the mold opening. The second actuator then moves the sub-base relative to the carriage along the central axis of the opening from the alignment position to the mold-engaging position where the blow pin enters the mold opening.

Preferably, the carriage is slidably received on rails disposed below an upper surface of the mold halves and the blow pin is constructed with a low profile to clear an extruder head above the mold. This permits a method of forming a blow molded product to be used wherein the blow pin is inserted into the mold (and a parison in the mold), while the mold is in a parison receiving position at the extrusion workstation of the blow molding machine or very nearly so.

In accordance with another aspect of the invention there is provided a rotary blow molding machine having a plurality of mold stations, each of which includes a blow pin assembly as described above.

Preferably, each mold station includes a mold clamp with each blow pin assembly being mounted on its associated mold clamp.

BRIEF DESCRIPTION OF THE DRAWINGS

A preferred exemplary embodiment of the present invention will hereinafter be described in conjunction with the appended drawings, wherein like designations denote like elements, and.

DETAILED DESCRIPTION OF THE PREFERRED EMBODIMENT

Figure 1:
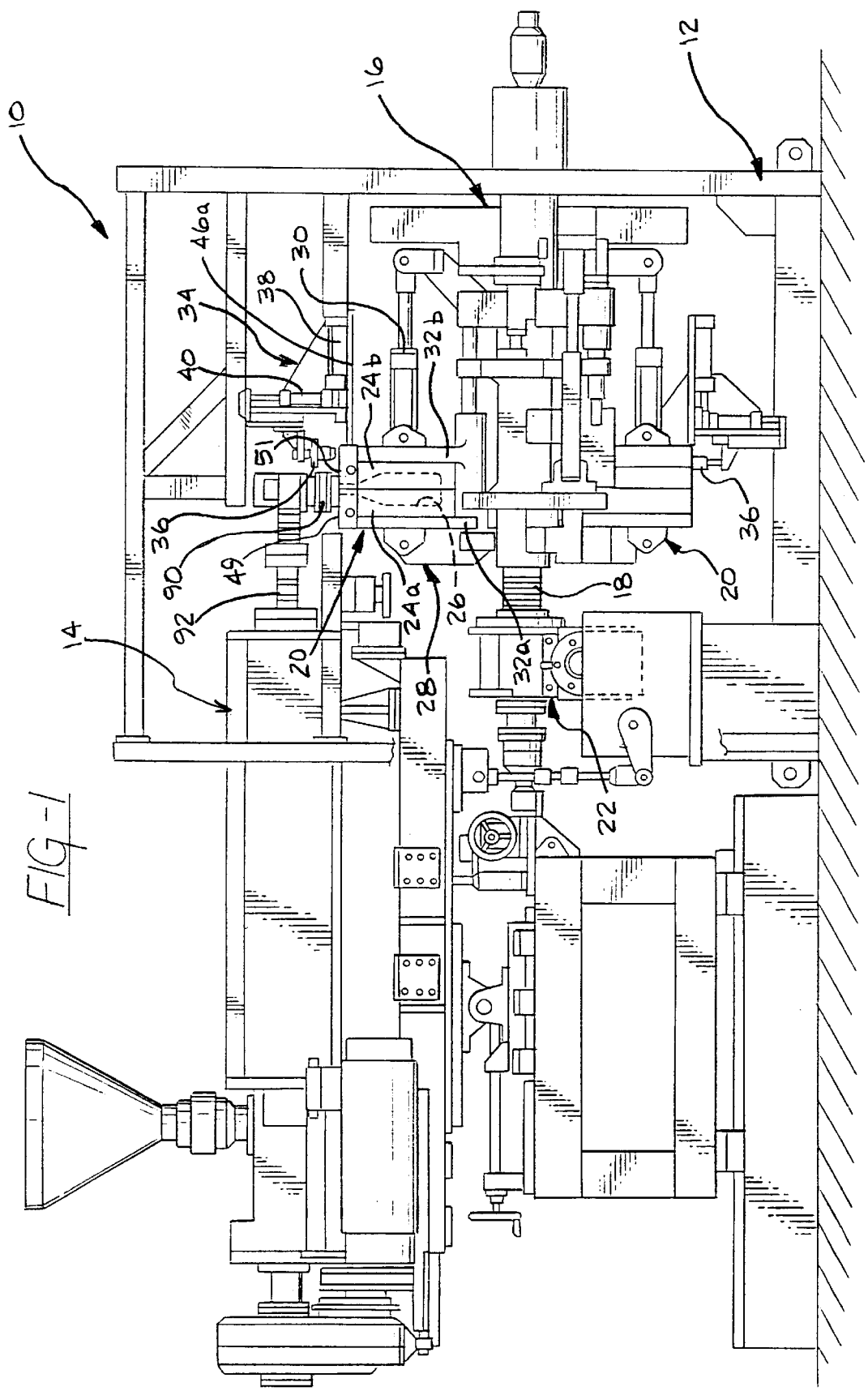
FIG. 1 is a side view of an embodiment of a blow-molding machine of the present invention.

FIG. 1 depicts a rotary blow-molding machine 10 of the present invention. In general, the blow-molding machine 10 includes a support frame 12, a parison extruder 14, and a carrousel 16 which is supported by an axle 18 on a frame 12. Mounted on carrousel 16 are a number of mold stations 20 circumferentially spaced around the axis defined by axle 18. In the illustrated embodiment, four mold stations 20 are utilized and it will be appreciated that blow-molding machines 10 can be designed to accommodate other numbers of mold stations (e.g., six or eight mold stations). Axle 18 is driven by an indexer 22 which is used to angularly index mold stations 20 around a circular path between a number of workstations. These workstations include a parison extrusion workstation at which extruder 14 is located and an article take-out workstation (not shown) at which is located a standard take-out mechanism (also not shown). If desired, other workstations, such as an in-mold labelling workstation, can be included around the path taken by mold stations 20.

Each mold station 20 includes at least one mold 24 that comprises a pair of mold halves 24a, 24b that mate together to form a mold cavity 26 which defines the ultimate shape of the article being manufactured by blow-molding machine 10. The mold halves are mounted in a clamp 28 that can be opened and closed under the force provided by a hydraulic cylinder 30. Clamp 28 includes a pair of opposed platens 32a, 32b on which the two mold halves 24a, 24b are mounted, respectively. When clamp 28 is closed, platens 32a, 32b press the mold halves tightly together under the force exerted by hydraulic cylinder 30. Clamp 28 can be constructed as shown in U.S. Pat. No. 4, 248,582, issued Feb. 3, 1981 to Merritt W. Martin, Jr., the entire contents of which are hereby incorporated by reference.

In addition to supporting mold half 24b, platen 32b also supports a blow pin assembly 34 constructed in accordance with the present invention. In general, blow pin assembly 34 includes a blow pin 36 and a pair of air cylinders 38, 40 that together move the blow pin between a retracted, or home, position and a mold-engaging position in which the blow pin 36 is in position to expand the parison within mold 24. Air cylinders 38 and 40 move blow pin 36 along orthogonally-related paths, with air cylinder 38 moving blow pin 36 in a first direction into an alignment position over the central axis (CL) of mold cavity 26 and air cylinder 40 moving blow pin 36 in a second direction generally transverse to the first direction from the alignment position to the mold-engaging position. By operating air cylinders 38 and 40 sequentially, blow pin 36 can be moved into and out of the mold-engaging position along a path that is coincident with the central axis CL of mold cavity 26. This helps minimize the possibility that blow pin 36 will catch and fold over an edge of the parison. This also permits pre-blowing of the parison by the blow pin 36, which helps insure that the tube of parison remains open as the blow pin 36 enters the opening 26a in mold 24.

The construction and operation of blow pin assembly 34 can be further understood by reference to FIGS. 2–5. Assembly 34 includes blow pin 36, air cylinders 38, 40, a base 42, a carriage 44 that slides along a pair of rails 46a, 46b relative to base 42, and a sub-base 48 that slides along a second pair of rails 50a, 50b relative to carriage 44. Base 42 is an axially extending plate that is unitary with platen 32b. Rails 46a, 46b are mounted on base 42 parallel to one another and are located near respective side edges 42a, 42b of base 42 and below upper edges 49, 51 of the mold halves 24a and 24b, respectively to facilitate insertion of the blow pin into the mold opening 26 while the blow pin assembly is adjacent to the extruder head. Carriage 44 is slidably supported on rails 46a, 46b by two sets of bearing blocks 52a, 52b, with each set being used to support carriage 44 on a different one of the two rails 46a, 46b. Carriage 44 includes a pair of lower support plates 54a, 54b, a forward-facing base plate 56, a pair of opposed, reinforcing side walls 58a, 58b, and a cross brace 60 that extends between side walls 58a, 58b. The two sets of bearing blocks 52a, 52b are mounted on the bottom side of lower support plates 54a, 54b, respectively. Side walls 58a, 58b are mounted to and extend upwards from the upper side of lower support plates 54a, 54b, respectively, and are each connected to the back side 56a of base plate 56.

Figure 2:
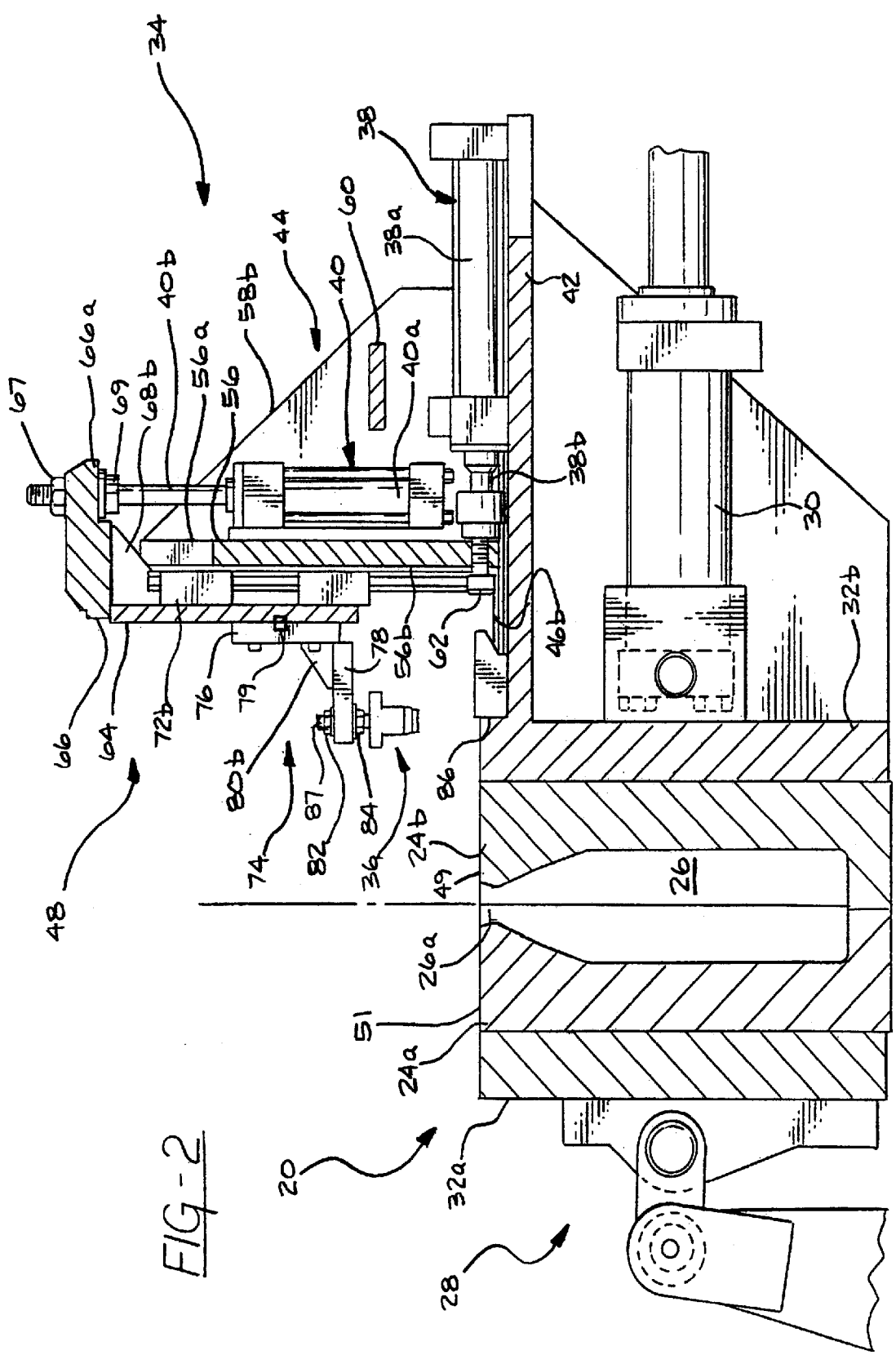
FIG. 2 is a side sectional view showing a blow pin assembly of the blow molding machine of FIG. 1.
Figure 3:
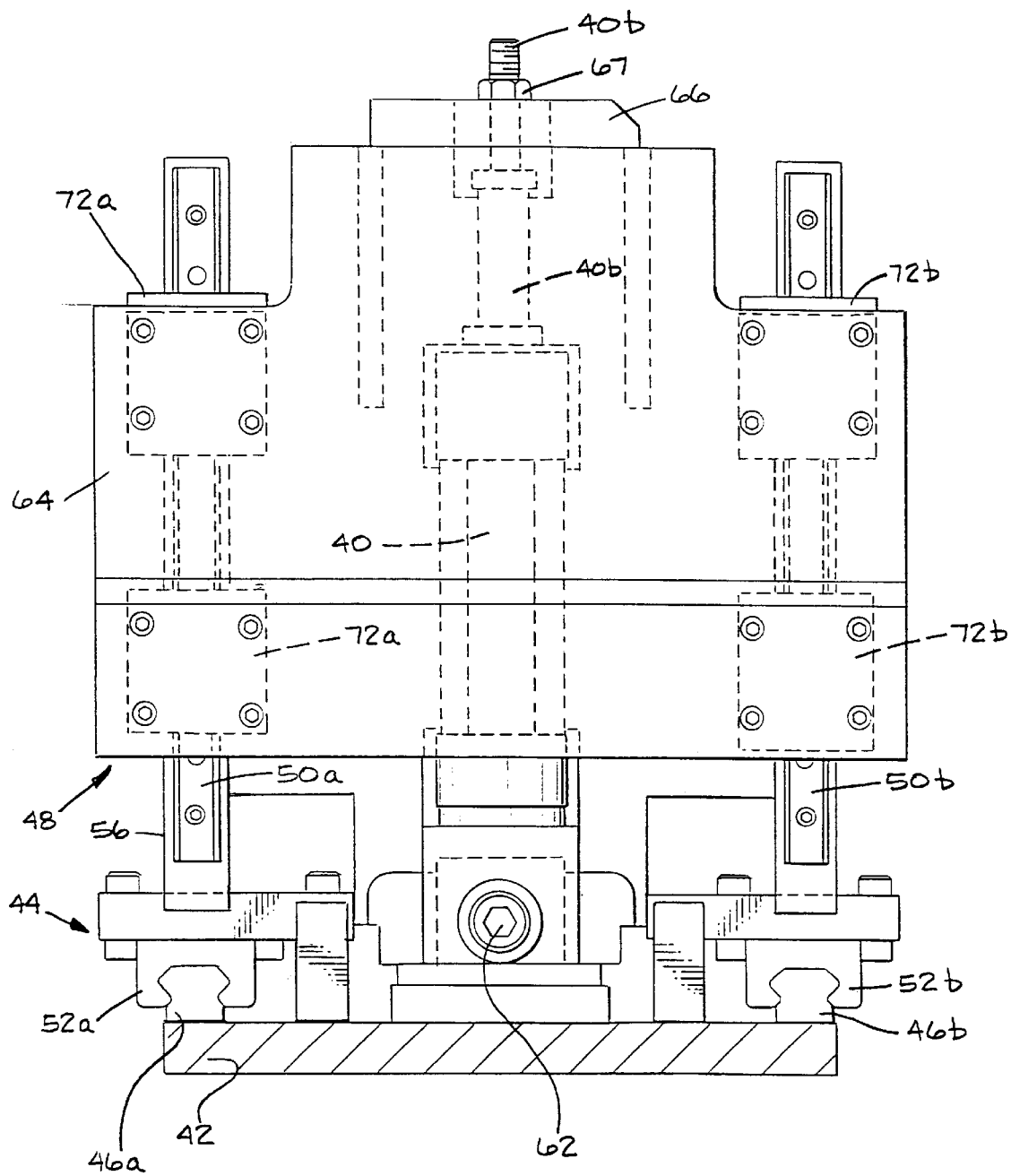
FIG. 3 is a front view of the blow pin assembly of FIG. 1.

Air cylinder 38 includes a piston housing 38a mounted to base, 42 and a rod 38b that is secured to base plate 56 using a bolt 62 shown in FIG. 2. Air cylinder 38 is operated in a conventional manner to axially reciprocate rod 38b into and out of housing 38a, as desired. This causes carriage 44 to move linearly along rails 46a, 46b, resulting in the blow pin 36 moving between the retracted position and the alignment position where it is aligned coaxially with the central axis CL of mold cavity 26 and located directly above opening 26a in mold 24.

The fundamental features of the mounting and construction of sub-base 48 are similar to those of carriage 44. In particular, sub-base 48 includes a mounting plate 64, a top plate 66, a pair of angle brackets 68a, 68b (only one shown) that connect mounting plate 64 to top plate 66.

Connected to mounting plate 64 are two additional sets of bearing blocks 72a, 72b which are used to attach sub-base 48 to the second pair of rails 50a, 50b so that it may slide relative to carriage 44. Rails 50a, 50b are mounted parallel to one another on the front side 56b of base plate 56.

Air cylinder 40 includes a housing 40a mounted on base plate 56 and a rod 40b connected to a recessed, rearward extension 66b of top plate 66.

Jam nuts 67, 69 may be used to adjust the effective length of rod 40b and thus the raised position of the blow pin 36 by adjusting the position of the top plate 66 on the rod. Activation of air cylinder 40 causes extension or retraction of rod 40b, thereby causing top plate 66, mounting plate 64, and thus blow pin 36, to radially toward or away from mold 24. As will be appreciated by those skilled in the art, this use of air cylinder 40 provides a more direct application of force by blow pin 36 onto opening 26a of mold 24 than is provided by the pivotal linkage blow pin assemblies that have heretofore been used on rotary blow molding machines.

Preferably, air cylinders 38 and 40 are sequentially activated so that blow pin 36 first moves generally transversely to the central CL to the alignment position and then moves along the central axis to the mold-engaging position shown in broken lines in FIG. 2. However, it will be appreciated that air cylinder 40 can be activated prior to the arrival of blow pin 36 at the alignment position with the net effect being that blow pin 36 moves in an inclined direction for at least a portion of the path between the home and mold-engaging positions. Although air cylinders 38 and 40 can be simultaneously operated in this manner, it will be appreciated that air cylinder 38 should be activated so that blow pin 36 arrives in position at the central axis of mold cavity 26 while it is still far enough away from opening 26a so that it will not catch and fold over an edge of the parison.

Figure 4:
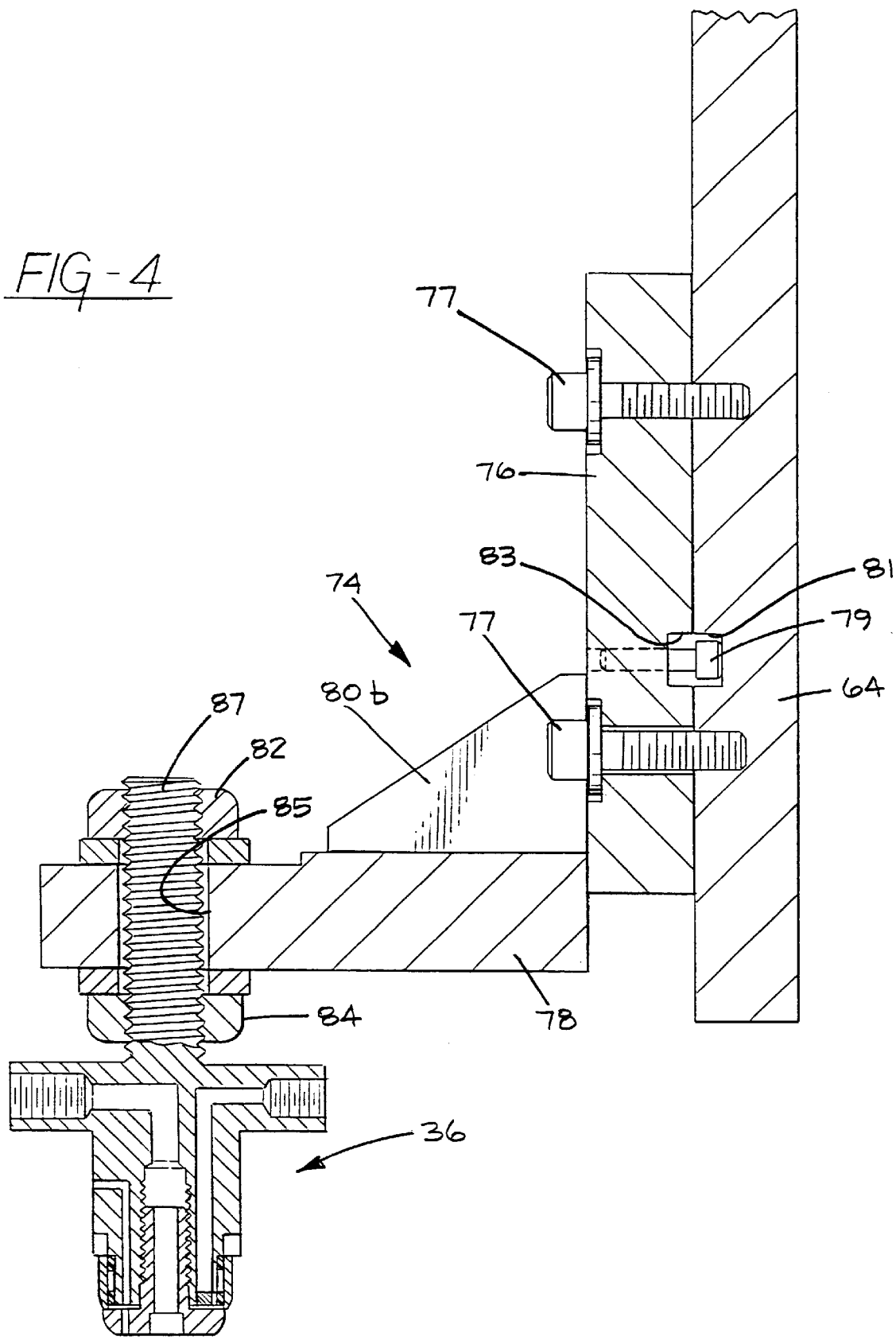
FIG. 4 is an enlarged, fragmentary cross-sectional view showing the construction of the blow pin.

With particular reference to FIGS. 2 and 4, blow pin 36 is attached to mounting plate 64 using a bracket assembly 74 that includes an interface plate 76, a support plate 78, and a pair of angle brackets 80a, 80b interconnecting support plate 78 and interface plate 76. Interface plate 76 is attached to mounting plate 64 with cap screws 77 and can be keyed to mounting plate 64 with a cap screw key 79 received in mating recesses 81, 83 of the mounting plate 64 and interface plate 76, respectively, to provide an exacting relative alignment. Support plate 78 and angle brackets 80a, 80b are all connected to interface plate 76 and can be made integral (as by welding) or unitary (as by machining from a single block of metal) with interface plate 76. Blow pin 36 is mounted through an oversized bore 85 within support plate 78 and is locked securely in place on support plate 78 by a pair of jam nuts 82, 84 disposed on a threaded shank 87 of the blow pin 36 on opposed sides of the support plate 78.

The use of an oversized bore 85 through support block 78 permits adjustment of the precise position of blow pin 36 relative to sub-base 48. This allows blow pin 36 to be adjusted as a part of the initial machine setup so that it coincides precisely with the central axis of cavity 26 when moved to the alignment position by air cylinder 38. To provide precise control of the extent of axial movement of blow pin 36 when rod 38b of air cylinder 38 is extended, base 42 includes a pair of stop members, or wedge stops, 86 (only one shown) that mate with corresponding wedge stops (not shown) located on carriage 44. Wedge stops 86 are located relative to their corresponding wedge stops on the carriage 44 such that they engage upon arrival of blow pin 36 at the alignment position to thereby prevent blow pin 36 from moving past the alignment position. The wedge stops 86 may be as disclosed in U.S. Pat. No. 5,971,741, the disclosure of which is incorporated herein by reference in its entirety.

Desirably, the interface plate 76 is mounted at the lower most end of the mounting plate 64 and the support plate 78 is in turn mounted at the lowermost end of the interface plate 76. Further, the blow pin 36 and its shank 87 are preferably compact to reduce their length or height. All of this, in addition to the position of rails 46a, 46b below the upper edges 49, 51 of the mold halves 24a, 24b provides a low-profile blow pin assembly 34 permitting the blow pin 36 to be inserted into the mold 24 beneath the retracted extruder head 90, as shown in FIG. 5, dramatically earlier in the cycle then prior blow pins, desirably before the mold 24 is significantly moved from the extruder workstation and preferably before the mold is moved at all from its parison receiving position in the extruder workstation.

Figure 5:
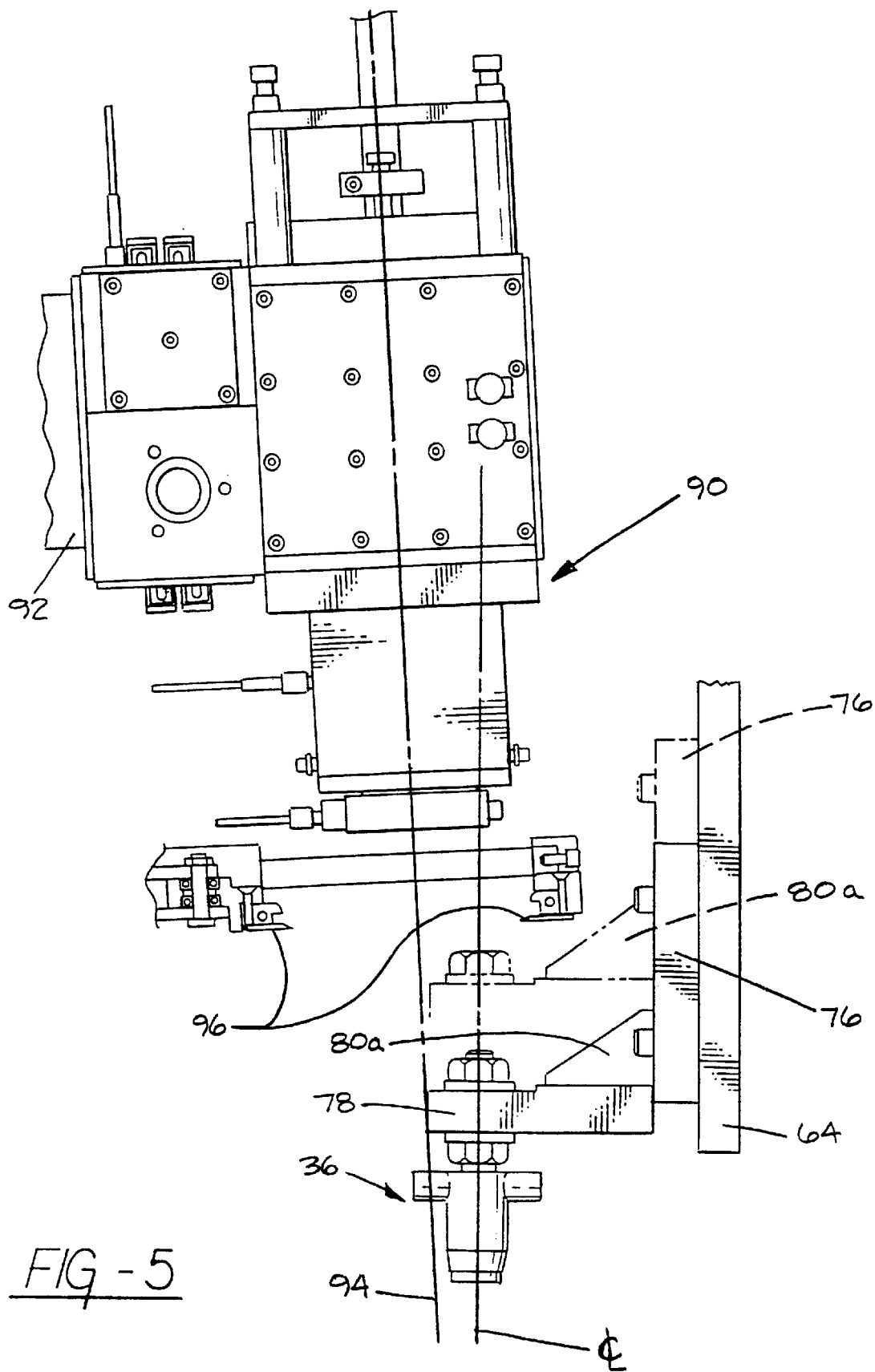
FIG. 5 is an enlarged fragmentary view illustrating the blow pin received under an extruder head at the extruder workstation of the blow molding machine of FIG. 1.

As shown in FIG. 5, the extruder head 90 is carried by an elongate arm 92 pivotally carried by the frame 12 to move the extruder head between lowered and raised positions relative to the molds. In its lowered position, the extruder head axis 94 is generally coincident with the axis CL of a mold in its parison receiving position at the extruder workstation. After a parison is extruded into a mold cavity, the extruder head 90 is raised or retracted away from the mold by pivoting the arm 92 upwardly. This disposes the axis 94 of the extruder head 90 at an angle relative to the axis CL of the mold cavity 26 and provides a gap between the extruder head 90 and mold. As shown in FIG. 5, even in its alignment position, raised from the mold (shown in phantom), the blow pin 36 can be moved below the extruder head 90 and even below parison cut-off blades 96 carried below the extruder head to be inserted into the mold. The blow pin 36 is inserted before the mold is indexed more than 5° from the its parison receiving position at the extruder workstation. In other words, the blow pin 36 is inserted before the mold is indexed more than 5° relative to the axis 94 of the extruder head 90 when it is in its lowered position desirably, before the mold is indexed more than about 2° and preferably before the mold is indexed at all (i.e. 0° movement) relative to the axis 94 of the extruder head 90 when it is in its lowered position.

Notably, this early insertion of the blow pin 36 into the mold 24 significantly increases the amount of time in which air may be forced into the parison and mold to achieve better cooling of the formed product which, among other things, facilitates subsequent handling and processing of the part. Still further, the early insertion of the blow pin 26 into mold 24 greatly increases the efficiency of the blow molding machine 10 by significantly increasing the quantity of product which can be produced in any given time frame.

Still further, the risk of the parison sagging or shifting in the mold, due to movement of the mold before the blow pin is inserted therein, is eliminated because the blow pin is inserted before any substantial movement and preferably before any movement at all, of the mold away from the extruder workstation. This results in a more uniform wall thickness of the formed part and potentially the ability to form the product from less raw material due to the more consistent wall thickness and end product in general. All of these significant practical advantages stem from the improved method of forming blow molded plastic articles wherein the blow pin 36 is inserted into the mold while it is within or substantially within the extruder workstation of the rotary blow molding machine 10.

It will thus be apparent that there has been provided in accordance with the present invention a blow molding machine, blow pin assembly therefor and a method of forming blow molded plastic articles which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

I claim:

1. A method of forming blow molded plastic articles with a rotary blow molding machine, comprising the steps of:
    extruding a parison into an open mold that is carried by the rotary blow molding machine and that is movable into and out of registry with an extruder head having an axis and being movable between raised and lowered positions;
    closing the mold;
    advancing and inserting a blow pin carried on the mold into the parison before the mold is moved substantially out of registry with the extruder head; and
    providing a pressurized fluid through the blow pin into the parison to expand it after closing the mold to form the plastic product according to the interior shape of the mold.

2. The method of claim 1 wherein the blow pin is advanced and inserted into the parison along a path which is substantially coincident with a central axis of the mold.

3. The method of claim 2 wherein the step of advancing and inserting the blow pin is accomplished by moving the blow pin along a pair of generally transverse paths.

4. The method of claim 3 which also comprises the step of retracting the extruder head from the mold prior to inserting the blow pin into the parison.

5. The method of claim 1 which also comprises the step of maintaining the blow pin at a height permitting it to pass beneath the extruder head as the mold is moved out of registry with the extruder head.

6. The method of claim 1 wherein the blow pin is inserted into the parison before the mold has been moved more than 5° relative to an axis of the extruder head when the extruder head is in its lowered position.

7. The method of claim 1 wherein the blow pin is inserted into the parison before the mold has been moved more than 2° relative to an axis of the extruder head when the extruder head is in its lowered position.

8. The method of claim 1 wherein the blow pin is inserted into the parison while the mold is at an extruder workstation of the blow molding machine and before any movement of the mold out of its parison receiving position at the extruder workstation.

9. A blow pin assembly for use with a rotary blow molding machine having a plurality of molds, each of which has at least two mold sections that mate together to define a mold cavity having an opening and a central axis extending through the opening, and an extruder with a head movable between raised and lowered positions and having an axis, the blow pin assembly comprising:
    a base;
    at least one rail disposed on the base below an upper edge of the mold sections;
    a carriage supported by said base, said carriage being movable relative to said base along said rail;
    a sub-base supported by said carriage, said sub-base being movable relative to said carriage;
    a blow pin mounted to said sub-base and being movable with said sub-base relative to said carriage and said base;
    a first actuator coupled between said base and said carriage, said first actuator being operable to cause said carriage and said sub-base to move relative to said base; and
    a second actuator coupled between said carriage and said sub-base, said second actuator being operable to cause said sub-base to move relative to said carriage, wherein, as a result of activation of said first and second actuators, said blow pin can be reciprocated between a home position and a mold-engaging position and wherein said blow pin moves into and out of said mold-engaging position along a path that is substantially coincident with the central axis of the mold cavity while the mold is at least substantially in its parison receiving position at an extruder workstation of the blow molding machine.

10. The blow pin assembly of claim 9 which also comprises a mounting plate, an interface plate carried by the mounting plate and mounted at the lower most end of the mounting plate and a support plate which carries the blow pin and is mounted on the interface plate at the lower most end of the interface plate such that the blow pin may be moved into its mold engaging position along a path within 5° of the axis of the extruder head in its lowered position.

* * * * *